May 12, 1959 L. I. GRIFFIN, JR., ET AL 2,886,514
FLUIDIZED SOLIDS PROCESS FOR COKING HEAVY OILS
Filed April 6, 1954 2 Sheets-Sheet 1

LINDSAY I. GRIFFIN JR.
EDWIN J. NEWCHURCH
ROBERT W. KREBS
RICHARD F. STRINGER
INVENTORS

BY Edwin M. Thomas ATTORNEY

May 12, 1959 L. I. GRIFFIN, JR., ET AL 2,886,514
FLUIDIZED SOLIDS PROCESS FOR COKING HEAVY OILS
Filed April 6, 1954 2 Sheets-Sheet 2

LINDSAY I. GRIFFIN JR.
EDWIN J. NEWCHURCH
ROBERT W. KREBS
RICHARD F. STRINGER
INVENTORS

BY Edwin M. Thomas ATTORNEY

United States Patent Office 2,886,514
Patented May 12, 1959

2,886,514

FLUIDIZED SOLIDS PROCESS FOR COKING HEAVY OILS

Lindsay I. Griffin, Jr., Edwin J. Newchurch, Robert W. Krebs, and Richard F. Stringer, Baton Rouge, La., assignors to Esso Research and Engineering Company, a corporation of Delaware Application April 6, 1954, Serial No. 421,416

3 Claims. (Cl. 208—127)

The present invention relates to a fluidized solids process for coking heavy oils, especially heavy petroleum oils such as residua from atmospheric and/or vacuum stills and the like. The invention pertains particularly to improvements in such coking processes which make it possible to increase the feed rate and throughput of a coking system. The invention involves also certain improvements in coking apparatus.

In the prior art, it has been proposed on numerous occasions to convert heavy hydrocarbon oils, particularly pertoleum residua, to more volatile products with conversion of part of the feed to coke. One of the most desirable of the prior art processes involves contacting the feed, in finely divided form, with a mass or stream of heat carrying solid particles to accomplish such conversion by thermal cracking. Solids which are catalytically inert are preferred, such as sand, coke, metal particles, glass beads, etc. The heat carrying particles may be in a mobile turbulent dense phase or so-called fluid bed, or they may be flowing in a stream in the form of a dispersion, as in the so-called transfer line type of operation. In either case, the solid particles, of appropriate particle size distribution, are preheated to a temperature usually above about 1000° F., and up to 1400° F. or higher. They are contacted with the finely divided oil, in the form of a spray or equivalent, and the sensible heat of the solids is utilized to (1) heat up the feed to cracking temperature and vaporize part of it and (2) crack the unvaporized portions. Since these operations extract heat from the solids, the actual operating temperature of the bed or other contacting mass, e.g. a suspension in a transfer line, is somewhat lower than the initial temperature of the solids as they enter the reaction zone.

The reaction zone operating temperature is preferably between 850° and 1200° F., the narrower range of 900° to about 1015° F. usually being preferred. For production of a good quality gas oil for cracking to gasoline, a reaction bed or zone temperature in the vicinity of 950° F. is specifically preferred for many feeds. A higher operating temperature usually produces more gas, which is commonly an uneconomical product. A substantially lower temperature tends to cause the solid particles to become overloaded with viscous, tacky deposits because these deposits are not dried up as they are formed. This causes agglomeration and faulty operation, unless the oil feed rate is kept undesirably low.

The optimum coking temperature range and feed rate vary considerably with the type or quality of feed stock, the nature and particle size distribution of the solids, and the design of the apparatus. In general it has been found that feed stocks of high Conradson carbon require low feed rates to avoid agglomeration of the solid particles and bogging of the system. Conversely, feed stocks of lower Conradson carbon may be fed at a higher rate, other conditions being equal. The feed rate, it has been found, may be approximately doubled for each increase in operating temperature of about 35° to 40° F., in the range of 900° to 1050° F. But the distribution and quality of the products frequently places definite upper limits on the operating temperature while agglomeration and bogging at lower temperatures place severe upper limitations on the allowable feed rate.

Careful and even distribution of the feed throughout the general mass of the heat carrying solid particles tends, other conditions being unchanged, to minimize the tendency of a fluid mass of solids to agglomerate and/or bog down. However, a further reduction in bogging tendency, it has now been discovered, can be obtained by incorporating some of the solids, preferably and especially some finer portions thereof, directly in the liquid oil stream that is fed to the coking zone. The effect of this is to increase to a substantial degree the allowable oil feed rate at a given temperature, particularly in the lower coking temperature ranges, i.e. from 850° to 1050° F. Such increase in feed rate, with the accompanying increase in unit capacity, is a major object of the present invention.

The desired result can be achieved, according to the present invention, by employing as a coker feed, a slurry containing a relatively small quantity of finely divided particulate solids suspended in the feed stock. The suspended finely divided solids contained in the slurrry appear to adhere to the larger heat-carrying solids and form a roughened surface on them. The rough surfaced particles are apparently less adherent and this makes it possible to increase the over-all feed rate quite substantially without undue agglomeration of the solids or bogging of a fluid bed of such solids.

Instead of introducing the finely divided solids into the reactor as a slurry with the feed, they may be introduced in the dry state directly to the reactor to accomplish a comparable result. In either case the result is that knobby irregular coke particles are produced which have less tendency to agglomerate. Although both methods of fines addition may be employed, the addition of very finely divided solids directly to the residuum feed is preferred in most instances to effect better distribution of such fines.

The invention will now be discussed in detail with reference to the drawings.

Figure 2:
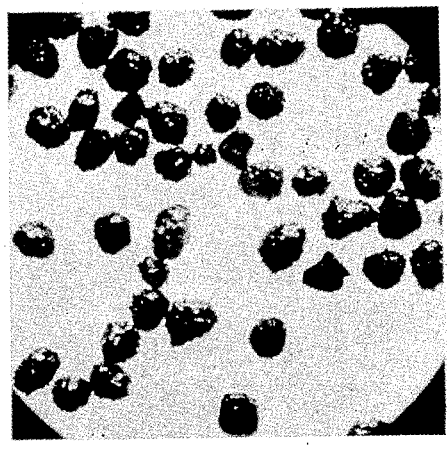
Figure 3:
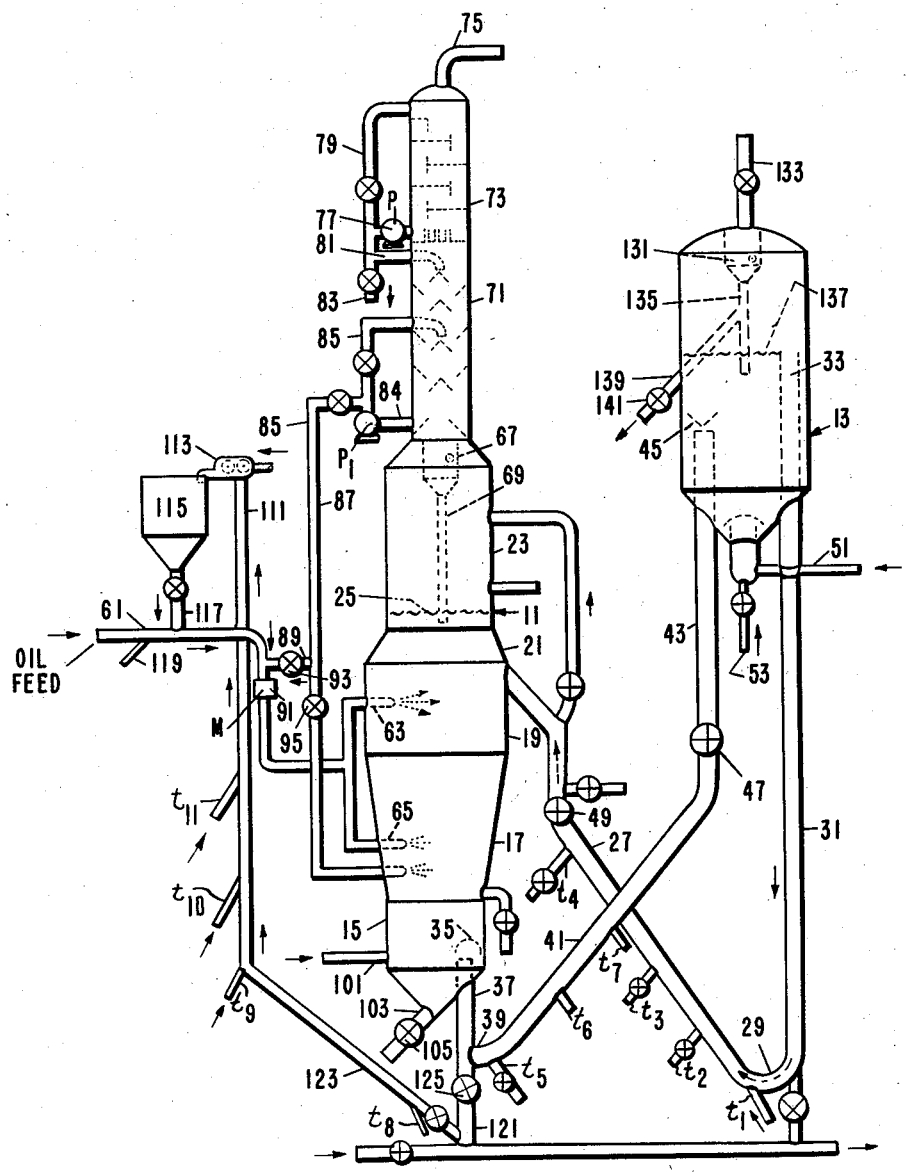
Fig. 3 shows a coking system wherein the oil is first contacted with finely divided solids to form a slurry, before being introduced into the reaction zone.

The finely divided solids, when suspended in the residuum feed, as in Fig. 3, appear to adhere to the larger heat carrying solids in the reactor to give them irregular shapes which resist cohesion. The small protuberances, caused by adhesion of very small projecting particles (see Fig. 2) prevent close contact of large surface areas of the larger particles. Hence the adhesive coating carried on the larger particles is less effective in bonding them together to cause agglomeration and defluidization. The region between the projections may be compared with valleys which serve as reservoirs for accumulation of the tacky components in the feed. In these relatively protected positions the tacky components are converted to coke without coming into substantial contact with similar components in the feed on other particles. The rough irregular surfaces therefore appear to be responsible to a considerable degree, through perhaps not entirely, for the higher permissible feed rate.

In general, the fine particles to be added to the feed are in the lower range of size of all the particles in the coking system. The added fines should be in a certain small fractional range of the median diameter of the circulating solids. For example, if $D_{avg.}$ of the circulating solids is 250 microns, $d_{avg.}$ of the added fines should lie between 15 and 75 microns, that is, $d_{avg.} = 0.05$ to $0.3$ $D_{avg}$. The preferred range is $d_{avg} = 0.1$ to $0.2$ $D_{avg}$, so that multiplying $D_{avg}$ of 250 microns by 0.1 to 0.2 results in 25–50 microns.

When the slurry feed system is used as is preferred, the solids added to the feed are preferably the smaller in particle size of the general mass of those used in the system. In fact, it is highly desirable that there be little or no overlap between the size of the added particles and the finest particles introduced or recirculated otherwise into the coking zone. The amount of the preferably very fine solids to be added to or combined with the feed before its distribution in or on the main mass of heat carrying particles may vary from 0.1 to 10% by weight of the oil feed. A preferred range of proportions, however, is between about 0.25 and 7%, the range of 1 to 3% being particularly preferred at present in most cases. These fine solid particles may be of the same substance as the particles which carry the heat for coking, or they may be of different material. They may be fine particles of Carborundum, glass, alumina, coke, metal, etc. Coke particles are usually preferred, since coke is a product of the process and therefore readily available and usually quite economical.

Coke is usually preferred also for the larger heat carrying particles in the fluid bed or in the transfer line suspension stream for the same reasons. It should be clearly understood that other substantially catalytically inert solids may be used as starting materials, but all of them are soon substantially coated with coke. As a matter of fact, even solids having mild catalytic activity, such as spent cracking catalysts, also may be used, though their activity usually does not continue very long because of rapid formation of deposits and catalyst poisons in the coking process.

Referring to the drawing, Fig. 3 there is shown a fluid bed coking system of the general type described in more detail in an application of Pfeiffer et al., Serial No. 375,088, filed August 19, 1953. The apparatus consists primarily of a coking vessel 11 and a burner 13 with suitable connecting lines and feed lines, etc. described to some extent below. From the dimensions given on page 22 of the specification of the Pfeiffer et al. case, Serial No. 375,088, it will be apparent that the fluid bed of coke particles is vertically arranged. The apparatus in the two cases show substantially the same vertical arrangement of sections.

The coking vessel 11 is shown as comprising a bottom stripping section 15, an upwardly expanding frusto-conical body section 17, a superimposed cylindrical section 19, a frusto-conical or reducing section above the cylindrical section 21, and an upper disperse phase section, more or less cylindrical in shape, indicated at 23. A bed of fluidized solids is indicated with its upper level at 25. Hot solids are supplied to the bed 25 through a conduit or riser 27 which connects, preferably through a relatively sharp U-bend or angle bend 29, to a standpipe 31. The latter is connected to an overflow outlet tube or section 33 in the burner 13. Suitable aerating taps $t_1$, $t_2$, $t_3$, and $t_4$ are provided at spaced points to aerate and propel the solids into the coking vessel.

The spent solids from the coking vessel pass downwardly through a screening device 35 into an outlet standpipe 37 and through a sharp U-bend or angle bend 39 into riser 41 having a terminal vertical section 43 by which the spent solids flow upwardly into the burner vessel. The solids are spread out in the burner vessel by a baffle 45. Aerating taps $t_5$, $t_6$, and $t_7$ are provided in riser 41, 43, where needed to carry the solids back to the burner. A control valve 47 in line 41 and a control valve 49 in line 27 regulate the flow or shut it off in emergency. The sharp U-bends or angle bends may themselves, with proper aeration, control the rate of flow and generally keep the system in balance as is well known in the art and as described and claimed in the United States patent to Packie, No. 2,589,124.

The coke in the burner is heated by combustion, air or oxygen-containing gas being supplied through a line 51 and also through the aerating taps $t_5$, $t_6$, $t_7$, etc., so as to burn part of the coke formed in the coking process and reheat the unburned solids. The latter are returned for supplying heat to the reaction vessel. Auxiliary fuel may be introduced into the burner through line 53, if desired, and this is usually required for starting up.

The oil to be coked is fed through an inlet line 61 to suitable spray nozzles 63 and 65, preferably arranged at a plurality of points and levels throughout the fluid bed of solids so as to provide good feed distribution. The more volatile fractions of the feed are rapidly vaporized and passed upwardly through the bed, helping to fluidize the bed. The higher boiling portions of the feed are deposited upon the solids of the bed and are gradually cracked and converted to more volatile products. All of these vapor products pass upwardly into a disperse or disengaging zone 23 where they are separated from a substantial part of the entrained solids. The vapors pass into a cyclone 67 from whence the fine separated solids are returned to the bed through a solids return line or dip leg 69. The vapors pass overhead into a scrubber section 71 which is superimposed, in the present case, on the top of the coking vessel. The scrubber may be elsewhere if desired. Here they are scrubbed by a flowing liquid, preferably a heavy bottoms fraction of oil, and they pass upwardly further into a fractionating section 73, all as described in greater detail in the Pfeiffer et al. application. The vapor products finally pass overhead to a recovery system through outlet line 75. The fractionator bottoms may be drawn off by means of a pump 77 and recycled to the top of the fractionator through line 79, returned to the scrubber to serve as a scrubber liquid through line 81 or withdrawn as a product through line 83.

The scrubber liquid which accumulates in the bottom of the scrubber section may be withdrawn by a pump P-1 in line 84 and recycled to the upper part of the scrubber section by a line 85. Since the scrubber bottoms usually contain some very fine coke particles or very fine solids entrained from the fluid bed, they also may be diverted back to the bottom of the coker through a line 87 and a branched line 89 is provided whereby the scrubber bottoms with the entrained fine solids particles may be mixed into the oil feed by means of a mixer 91. These solids may assist in accomplishing the general objectives of this invention, i.e., to reduce agglomeration and bogging of the bed. Suitable valves are provided as indicated at 93 and 95 so that the scrubber bottoms may be returned directly to the coker bed or mixed with the feed to incorporate the desired solid particles into the feed substantially as shown but not claimed in the Pfeiffer et al. application.

The solids withdrawn from the coker are stripped in the bottom section 15 which constitutes a stripping section by means of an upflowing gas such as steam introduced through a line 101. Lumps or agglomerated particles too large to pass through the screen 35 and into the return line 37, 41 may be withdrawn from the bottom of the stripper through an outlet 103 provided with a control valve 105 as also described in the Pfeiffer et al. application.

While the fines contained as a slurry in the scrubber bottoms are of utility in increasing the allowable feed rate, it is usually desirable to add further solids to the feed and to mix them into the feed thoroughly so that they will be well dispersed and suspended therein. There are several suitable sources for such fine solids in the system. Product coke may be withdrawn from the line 37 at the bottom of the coking vessel through valve 125 and a line 121. This may be diverted into a sloping riser 123 and a vertical riser 111 through a grinder or attritor 113. Suitable aerating or lifting jets of steam or other suitable inert gas are provided at $t_8$, $t_9$, $t_{10}$, and $t_{11}$. The required amount of solids, preferably coke, may thus be supplied for grinding and mixing into the fresh feed. This grinding device 113 may comprise a pair of rollers, a ball mill, or other grinding apparatus. A preferred grinding device is an impact attritor and classifier of the type described in an application of Boisture et al., Serial No. 403,218, filed January 11, 1954, now abandoned, or that described in United States Patent No. 1,614,314. Alternatively, high velocity gas or steam jets may be projected into a bed, transfer line or other mass of particulate coke to break it up into particles of fine mesh.

When a grinder or attritor is used outside the coking bed, the finely ground particles, below 50 microns in size, and preferably 0.1 to 0.2 of the average diameter of the main mass of particles in the coker, are passed into a hopper 115 from which they may be fed through line 117 into the feed line 61 to mix with the oil. A mixing jet of high velocity is provided through which oil, vapor, or steam may be introduced as indicated at 119 to effect thorough mixing of the fine solids with the oil. In this case the mixer 91 may not be necessary. Preferably, the fines from the hopper 115 are mixed by jet 119 partially and then passed on to the mixer 91 for more thorough mixing so that they will be well dispersed in the oil as it is fed through nozzles 63, 65.

Another desirable source of fines is the cyclone 131 in the burner. The flue gases which pass upwardly through cyclone 131 and through the stack 133 have their entrained solids separated and returned through solids return line 135 to the bed 137 in the burner. A branch line 139 provided with a valve 141 may be connected with the solids return line 135 to carry the fine solids out of the burner and they may be carried in any suitable manner not shown into the hopper 115, with or without passing them through grinder 113 as may be desired. In some cases, several stages of cyclone separation may be used, and here the fines collected from any or all of the cyclones may be used, the precipitate from the final stages being preferred because of its fineness.

With the above system it will be understood that a slurry of fine coke or other solids from the scrubber system may be used, coke from the burner cyclone may be used, and fine particles selected from the solids at any point in the apparatus may be mixed into the feed. A particularly desirable source of fine coke particles not shown in detail above is the finer particles from a classifier or elutriator on the impact jet attritor described in the Boisture et al. application mentioned above. The grinder 113 may be considered to represent diagrammatically the impact jet attritor and classifier described in said Boisture et al. application. As pointed out above, from 0.1 to 10% of fine solids based on the weight of the feed may be used but the limits preferably are between about 0.25 and 7% with 1 to 3% being preferred for most feeds.

The following tabulation shows advantages to be obtained by using finely subdivided coke to add to the feed.

Basin 33% by adding 2 weight percent of coke particles, based on feed. It is known that for a given set of coker operating conditions the maximum coke production rate is a constant and is related to the maximum operable feed rate according to the following equation—

$$(W./hr./w.)_{maximum} \left( \frac{\text{percent coke make on Feed}}{100} \right)$$
$$= \text{max. coke production rate, \# coke/hr./\# solids}$$

A feed of low Conradson carbon produces a small percentage of coke and has a high permissible feed rate, while a feed of high Conradson carbon produces a large percentage of coke and has a low feed rate. The amount of added fine particles required to achieve a given feed rate can be calculated with knowledge of the coke forming tendency (Conradson carbon) of the feed from the following relationship, Let $(W./hr./w.)_a$
= maximum operable feed rate with added coke fines $(W./hr./w.)_0$
= maximum operable feed rate with no fines added $$K = \frac{\text{Increased coke production rate}}{\text{coke fines addition rate}}$$

Then $(W./hr./w.)_a$
$$= \frac{(w./hr./w.)_0 \, (\text{percent coke make on feed})}{(\text{percent coke make on feed}) - (K \times \text{percent coke particles added based on feed})}$$

For added fines with an average diameter 0.1 times the average diameter of the heat carrying solids, $K$ equals 2, as shown in the above data table. The value of K may change to some extent with a change in ratio of median diameter of added fines to median diameter of heat carrying solids; however, for a given ratio of median diameters, K will be substantially constant for all feeds.

Figure 1:
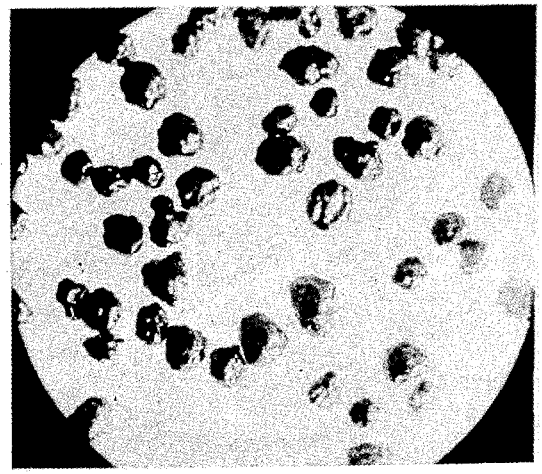
Fig. 1 and Fig. 2 are enlarged photographs of heat carrying coke particles of earlier coking processes and of the present coking process respectively.

The effect of precontacting the feed with a minor and finer portion of the solids is shown clearly by the striking contrast between Figs. 1 and 2, as well as by the data of Table I, above.

It will be understood that the process described above, of adding fine solid particles to heavy oil feed, is applicable to systems using a transfer line coker and/or burner, and to any system where a mobile mass of heat-carrying particulate solids are contacted by a feed stock which tends to cause agglomeration of the particles.

The addition of very fine solids to the fluidized bed itself is effective in some degree and is especially effective where these fines are introduced at such points and/or in such manner that they can contact and adhere to the larger particles to establish rough, non-adherent surfaces thereon. In its broader aspects, the invention contemplates the roughening of the surfaces of the major coke particles by forming coke protuberances thereon to reduce cohesion, by (a) adding relatively very fine coke

*Table I*

Coker operation conditions:
 1025° F. reactor temp.—1 ft/sec. reactor gas velocity.
 35-80 mesh (417μ-175μ) heat carrying solids (270μ av. dia.).
 Coke fines added—through 325 mesh (27μ av. dia.).

| Feed | Wt. Percent Coke Particles on Feed | Maximum Operable Feed Rate, W./Hr./W. | Increase in Coke Production Rate, #Coke/Hr./#Solids | Coke Particles Addition Rate, #Coke/Hr/#Solids | $K = \frac{\text{Increased Coke Production Rate}}{\text{Coke Fines Addition Rate}}$ |
|---|---|---|---|---|---|
| S. La. Resid | 0 | 1.8 | | | |
| S. La. Resid | 5 | Above 2.6 | | | |
| S. La. Resid | 2 | 3.0 | 0.120 | 0.060 | 2.0 |
| Elk Basin Resid | 0 | 0.9 | | | |
| Elk Basin Resid | 2 | 1.2 | 0.054 | 0.024 | 2.2 |

These data show that the allowable feed rate of South Louisiana residuum was increased 67% and that of Elk particles to the incoming feed as in Fig. 3 or (b) by introducing fines in the dry form into the coking reactor.

Various other modifications will be apparent to those skilled in the art and it is intended to cover them within the scope of the appended claims, so far as the prior art permits.

What is claimed is:

1. In a process for coking a heavy hydrocarbon oil by contacting the oil feed coking charge stock at a coking temperature in the range of about 850°–1050° F. with a substantially vertically arranged body of coke particles maintained in the form of a dense turbulent fluidized bed in a coking zone, said bed constituting a major proportion of the solids in said coking zone, removing product vapors overhead from said coking zone, scrubbing said product vapors to remove heavy ends and entrained coke fines from said product vapors to form a slurry of fines and returning said slurry to said coking zone, withdrawing coke from said coking zone and passing it through an extraneous heating zone wherein a portion of the coke particles is heated and then sent back to said coking zone to supply heat thereto, the improved method of maximizing oil feed rate and preventing bed bogging which comprises mixing an additional amount of about 0.25 to 7 weight percent based on the oil feed of finely divided coke particles with the oil feed, the finely divided coke particles having an average diameter below about 50 microns and in the range of 0.1–0.2 the average diameter of the coke particles in said fluidized turbulent bed and being utilized in an amount sufficient only to constitute a minor proportion of the solids in said coking zone, thereafter feeding the oil feed charge containing the added finely divided coke through spray nozzles arranged at a plurality of points and levels into the fluidized bed for contact with the larger coke particles in said coking zone whereby protuberant small particles of said coke are deposited on said larger coke particles in said dense fluidized turbulent bed to reduce cohesion of said larger coke particles in said fluidized bed and thereby reduce agglomeration and permit a higher maximum oil feed rate to said coking zone.

2. The process according to claim 1 wherein there is substantially no overlap between the sizes of the added finely divided coke particles and the finest particles present in the dense fluidized bed of coke particles in said coking zone.

3. A process according to claim 1 wherein at least part of the added finely divided coke particles is obtained by grinding some of the larger coke particles withdrawn from the bottom portion of said dense fluidized bed in said coking zone.

References Cited in the file of this patent

UNITED STATES PATENTS

| | | |
|---|---|---|
| 2,340,974 | Myers | Feb. 8, 1944 |
| 2,443,714 | Arveson | June 22, 1948 |
| 2,548,030 | Leffer | Apr. 10, 1951 |
| 2,598,058 | Hunter | May 27, 1952 |
| 2,600,430 | Riblett | June 17, 1952 |
| 2,717,867 | Jewell et al. | Sept. 13, 1955 |
| 2,723,223 | Nicholson | Nov. 8, 1955 |